United States Patent [19]

DiGiacomo et al.

[11] 4,074,423
[45] Feb. 21, 1978

[54] SYSTEM AND APPARATUS FOR ASSEMBLING INDUSTRIAL LEAD-ACID STORAGE BATTERIES

[75] Inventors: Hector L. DiGiacomo, Lafayette Hill; John A. Sacco, Wernersville, both of Pa.

[73] Assignee: General Battery Corporation, Reading, Pa.

[21] Appl. No.: 695,858

[22] Filed: June 14, 1976

Related U.S. Application Data

[63] Continuation-in-part of Ser. No. 652,715, Jan. 27, 1976.

[51] Int. Cl.² .............................................. H01H 69/02
[52] U.S. Cl. ...................................... 29/730; 29/623.1; 164/109; 164/DIG. 1; 228/32; 228/45; 228/901
[58] Field of Search ................... 29/204 R, 623.1, 730; 164/DIG. 1, 109, 334, 333; 228/25-28, 32, 45, 901, 50, 215, 216; 429/161

[56] References Cited

U.S. PATENT DOCUMENTS

| 339,367 | 4/1886 | Bittenbender | 100/289 |
|---|---|---|---|
| 1,410,716 | 3/1922 | Peers | 249/97 |
| 1,715,020 | 5/1929 | Grimmenstein | 228/58 |
| 1,841,194 | 2/1932 | Lormor | 228/901 X |
| 2,759,445 | 8/1956 | Winkel | 164/333 |
| 2,767,609 | 10/1956 | Cousino | 85/32 |
| 2,808,800 | 10/1957 | Winkel | 164/322 |
| 3,052,968 | 9/1962 | Kerns | 29/204 R |
| 3,138,860 | 6/1964 | Meshew | 29/204 R X |
| 3,597,825 | 8/1971 | Meislitzer | 29/204 R |
| 3,813,024 | 5/1974 | Kirchberger | 29/204 R X |

FOREIGN PATENT DOCUMENTS

| 2,240,774 | 8/1972 | Germany | 29/204 |

Primary Examiner—Carl E. Hall
Attorney, Agent, or Firm—Benasutti Associates, Ltd.

[57] ABSTRACT

A novel system for assembling industrial or motive power batteries is described which basically comprises a conveyor surface, a plurality of stacking box means freely movable across said conveyor surface, tilt table means for engaging in tilting said stacking box, and a novel burning apparatus for forming battery straps on any of a plurality of different sized battery stacks formed within said stacking box means. Additionally, a novel automated burning apparatus is provided wherein a plurality of torches are adapted for a square movement across the terminal lugs of the battery stack, thereby facilitating the formation of battery straps and terminal posts on each of a plurality of battery stacks during a single operation. Utilization of the present system facilitates the efficient manufacture of industrial or motive power batteries of any of a number of different sizes.

14 Claims, 11 Drawing Figures

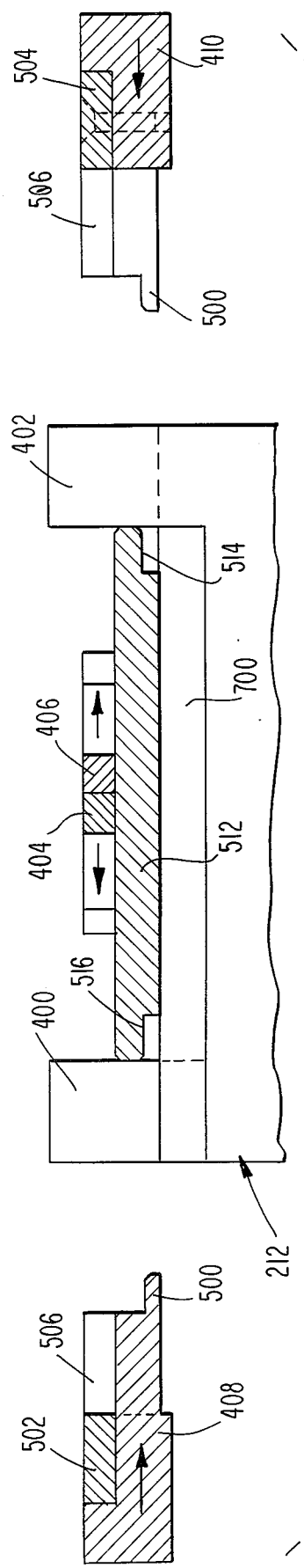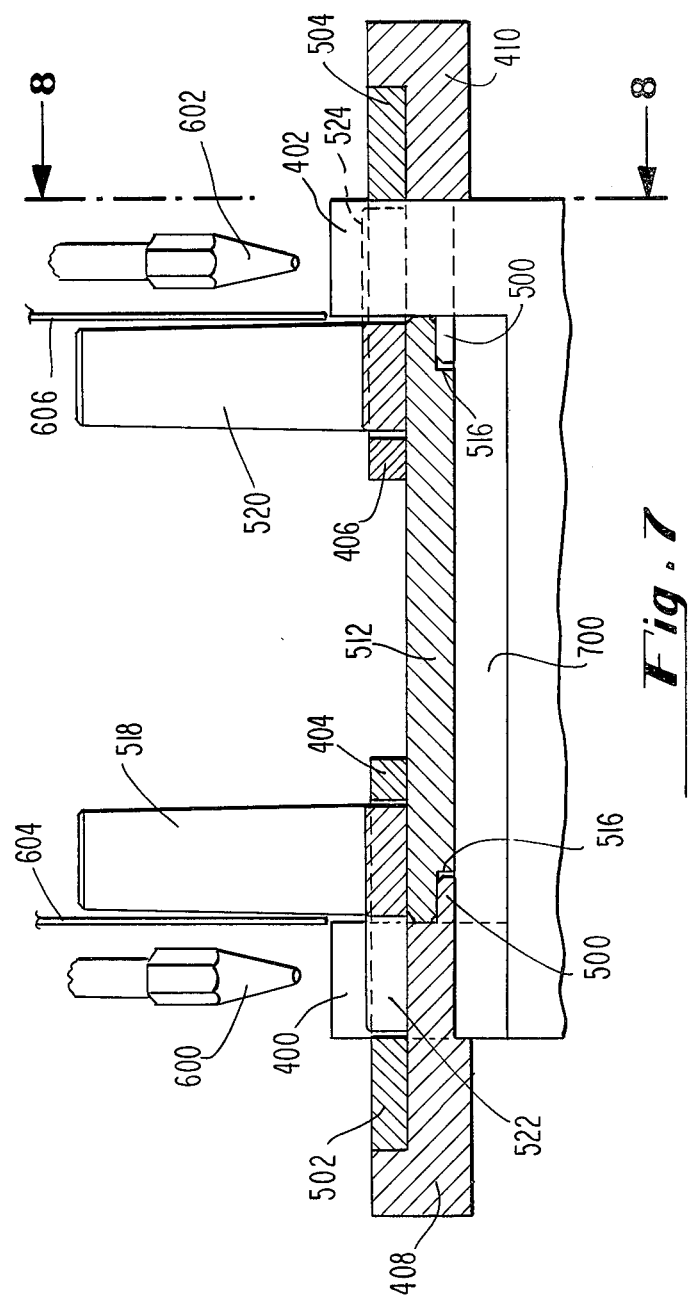
Fig. 4
Fig. 7

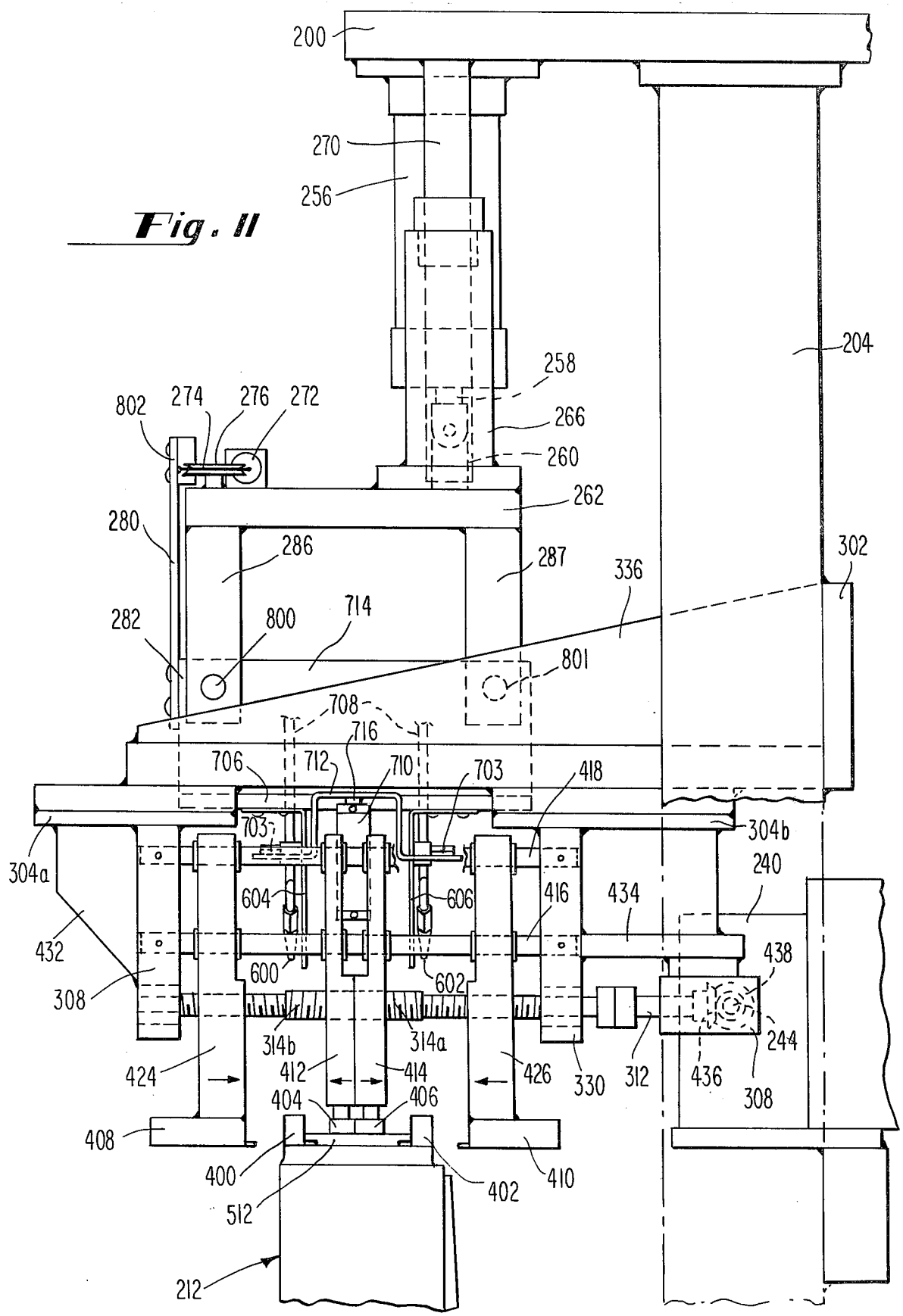

SYSTEM AND APPARATUS FOR ASSEMBLING INDUSTRIAL LEAD-ACID STORAGE BATTERIES

CROSS REFERENCE TO RELATED APPLICATIONS

The present application is a continuation-in-part of my prior copending application Ser. No. 652,715, filed Jan. 27, 1976, entitled "Industrial Battery Stack, and Apparatus and Method for Stacking, Aligning and Burning Same", which prior application is specifically incorporated by reference as if fully set forth herein.

BACKGROUND OF THE INVENTION

The present invention relates generally to industrial or motive power batteries, and more particularly, to the portion of the assembly process of those batteries wherein completed positive and negative plates and separators are stacked and formed into fused battery stacks having terminal posts projecting therefrom which are subsequently assembled into completed batteries by first placing the completed battery stacks into battery jars, by sealing the battery jars having the battery terminal posts extending therefrom, and finally, by interconnecting the protruding terminal posts of various battery stacks to those of adjacent battery stacks to form a completed battery.

The present invention does not relate to the formation of welds or electrical connections between the battery terminal posts of adjacent battery jars, such as described in U.S. Pat. No. 3,908,742, which describes the prior art hand burning process which has generally been in use to form such connections. Rather, the present application is directed to the field of stacking, aligning, burning and transferring battery stacks into each individual battery jar prior to the completion of the remaining steps in the battery assembly process.

Previously, battery stacks have been formed by hand usually by interleaving positive and negative plates and separators into a three-surfaced container which was tilted slightly out of the horizontal in order to facilitate the alignment of the plates and separators with respect to each other. Once an appropriate number of battery plates and separators were present within the stacking container, the unfused battery stack was then removed from the container by hand and transferred to any of a number of different apparatuses intended to facilitate the burning of battery straps thereon. The battery straps were formed as follows: protruding from the top terminal edge of each of the negative and positive plates on different respective sides of the battery stacks are formed terminal lugs which protrude beyond the top terminal edge of the battery stack; around these terminal lugs are clamped appropriately configured rails or combs to form a mold for subsequently melted lead. An operator using a hand torch adjusted to a neutral or slightly carbonizing flame then melts the portions of the lugs extending up through the mold, adding lead from a suitable supplemental source in order to completely fill the mold into a bar or strap which extends completely across the plates to be formed into a single stack, and further to fuse into that strap an adjacent terminal post which, upon later assembly, will extend through the top cover of the battery jar to facilitate connection with an adjacent battery jar to complete the final battery. In accomplishing this hand burning process an operator is careful to preheat the lugs so that upon melting cold runs will be avoided, and further, following the filling of the mold area with molten lead to allow that lead to puddle in order to form a uniform homogeneous weld. The combs or molds are then removed from the stacks and the fused stack is transferred, normally by hand, to its intended battery jar, which stack is inserted into the battery jar by placing a funnel-shaped guide over the top opening of that jar and feeding the bottom of the completed stack into that funnel-shaped guide, and pushing the stack down into the jar to its intended operating position.

Alternatively, it has been suggested to automate the combs described above by introducing the stacks into a machine which will elevate the stacks between the combs and then, in scissors-like fashion, move the combs together to surround the appropriate lugs. Therefore, introduction of the plates in such machines is accomplished by hand loading the stacks in a direction substantially perpendicular to the axis of the combs and under the combs, and then elevating the stacks so that the lugs extend between the combs prior to closure thereof. While this technique has met with some success, it has heretofore been difficult to properly align and space the lugs with respect to each other so that they properly engage the combs upon closure of the combs therearound. This is explained in part by the fact that industrial storage battery plates are substantially longer and wider than automotive battery plates, and therefore are likely to bend or warp slightly along their length and width, particularly when subjected to a mechanical pasting operation and subsequent wrapping with microporous materials.

Due to the ever increasing size of industrial battery plates and due to the fact that the above described prior art processes necessitated picking up stacks of many interleaved plates and separators, back injuries to workers in industrial battery plant operations were extremely numerous and have represented during recent years a serious production problem. Furthermore, the constant moving of lead plates and separators from station to station encourages the generation of lead and lead oxide dusts which, if inhaled in excessive quantities, may become a health problem. Finally, due to the nature of the hand operations involved in the construction of industrial storage batteries, the quality of any given production run was likely to be dependent upon the skill of the particular workmen assigned to that run.

SUMMARY OF THE INVENTION

The present invention provides a modern, effecient industrial battery assembly system which basically comprises a large conveying surface for transferring a plurality of stacking boxes between a tilt table means, a burning station and a hoisting station. Unlike previous prior art processes, the present assembly system requires manual lifting of no more than one plate or separator at a time. Once stacks are formed in a battery box, plates are not removed from the battery box nor are alignment problems normally encountered since the spacing between the protruding terminal lugs of various plates can accurately be aligned by adjusting the ram of the box to an appropriate position when the box is either at the burning station or at a position on the conveying surface intermediate the various stations so that there is free access to the plates and separators of the box. Following stacking of the plates in the battery box, the tilt table is operated to move from the stacking position to the normal position, whereupon the box may be slid upon the conveying surface to the burning station, whereupon the protruding lugs are introduced between the combs in an axis substantially parallel to the axis of the combs. The combs are then activated to surround at least a portion of the terminals to provide a mold and the burning head is lowered from a first retracted position to a second burning position, whereupon the torch carriage bearing a plurality of torches moves in a direction substantially parallel to the axis of the combs and to the rows of the lugs protruding therethrough. The first of a plurality of burners acts to preheat the lugs somewhat in advance of its path of movement and to melt the lugs directly thereunder, while the second burner or torch acts to ensure complete melting of the lugs and to provide a post-heating or puddling cycle for the lead following the path of movement of the torch carriage. Applicant has found that the best orientation for these torches with respect to the lugs being melted is an angle approximately 15° away from a perpendicular axis with respect to the plane of the lugs, that is, the torches are aimed at an angle approximately 15° forward in advance of their path of movement along the lugs. At the end of the movement of the torch carriage over the lugs completing the melting of the straps thereon, the entire torch carriage is withdrawn vertically away from the battery stacks and the torch carriage is allowed to reciprocate from the final to the start position to prepare for the next burn. Therefore, the torch carriage describes a square movement during the operation of the apparatus. The withdrawal of the torch carriage away from the battery stack allows the torch to be maintained in the pilot condition while facilitating superior access to the top of the battery stack for inspection of the welds and straps formed thereon, and further to facilitate the immediate removal of the combs therefrom and the transfer of the battery box out of the mechanism without waiting for the torch carriage to return to its starting position. Finally, in the event that the straps are not suitably formed by the automated process, the withdrawal of the torch carriage away from the battery stack facilitates hand burning of any portions of the straps which are not suitable for production purposes. Following formation of the straps, the battery box is then transferred along the conveying surface to a hoisting position, wherein a hoist engages each individual battery stack by lifting that battery stack by engaging the undersurfaces of the straps formed as aforesaid. The hoist then transfers the stack basically laterally out of the battery stacking box to an adjacent battery jar fitted with a funnel-shaped guide, as described above, and the battery stack may be directly lowered into the battery jar by the hoist. By orienting the battery jar substantially lower than the conveyor plane, insertion of the completed battery stack into the battery jar is easily facilitated in a position where additional manual operations as required are extremely convenient. Such operations may include manual guiding of the battery stack into the funnel and, occasionally, if necessary, manual alignment of the separators within the battery stack.

Following emptying of the battery box, the box is then conveniently transferred to the tilt table station for reloading, thereby accomplishing the rapid recirculation of battery boxes.

The above described operations provide a simple, efficient method for constructing and assembling the stacks of industrial batteries into their respective battery jars. This and other objects of the present invention will be better illustrated from the following more detailed description.

BRIEF DESCRIPTION OF THE DRAWINGS

FIG. 4 is a cross section of a portion of the burning station shown in FIG. 3 taken as indicated by the lines and arrows 4—4 in FIG. 3, on a greatly enlarged scale;

FIG. 7 is a cross section similar to that shown in FIG. 4 wherein the combs have been moved to the molding position and the torch carriage has moved to the position illustrated in FIG. 5;

FIG. 11 is an end view of the burning station illustrated in FIG. 2 taken as indicated by the lines and arrows 11—11 in FIG. 2, on an enlarged scale.

DETAILED DESCRIPTION OF THE DRAWINGS

Figure 1:
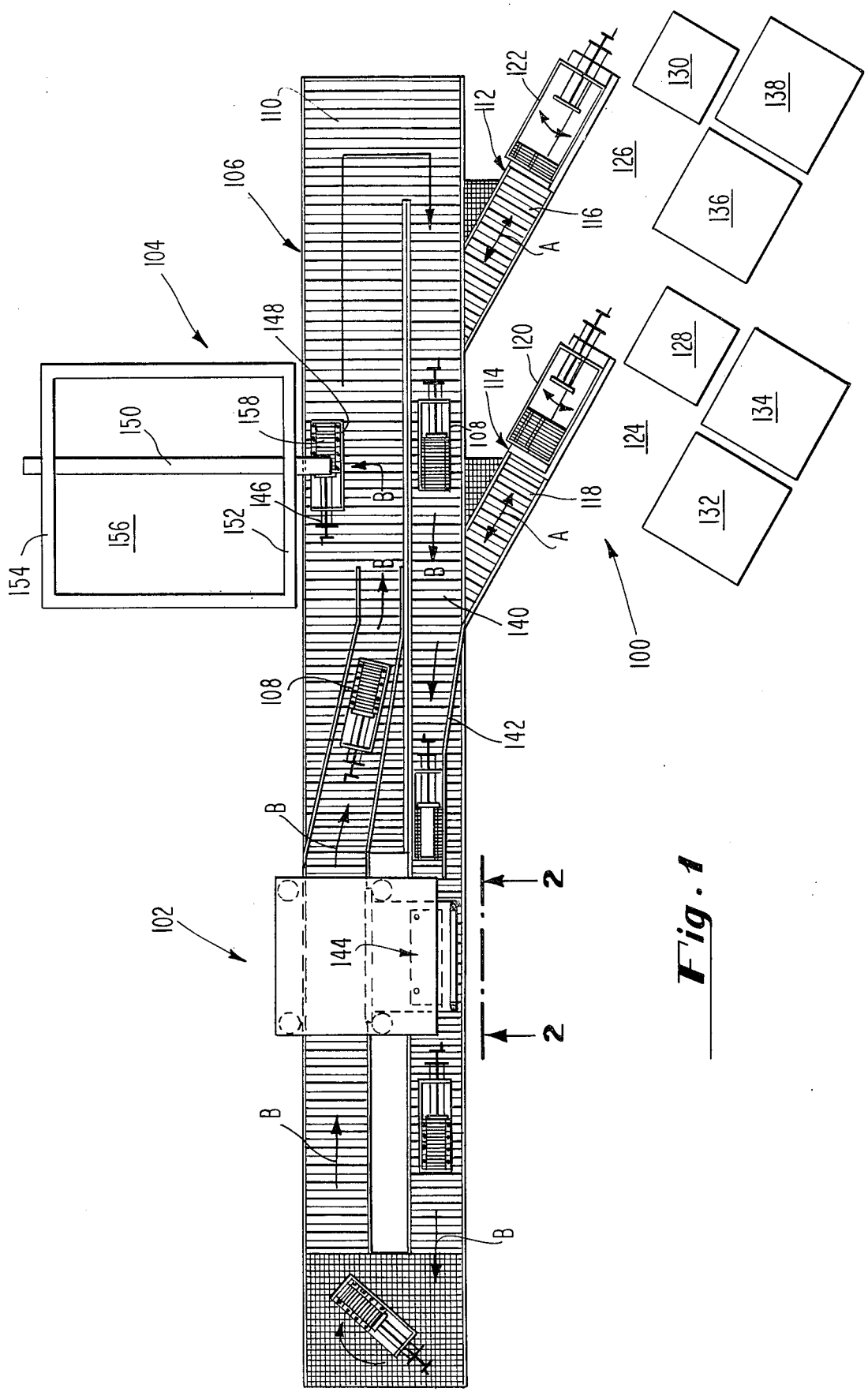
FIG. 1 is a top diagrammatic view of the industrial battery assembly system of the present invention.

Although specific forms of the invention have been selected for illustration in the drawings, and the following description is drawn in specific terms for the purpose of describing these forms of the invention, this description is not intended to limit the scope of the invention which is defined in the appended claims.

Referring now to FIG. 1, a top plan view of the entire system of the present invention is generally illustrated. As seen in FIG. 1, the system basically comprises three distinct stations: a stacking or tilt table station designated generally 100, a burning station designated generally 102, and a hoisting station designated generally 104. A conveying surface designated generally 106 is provided which communicates with each of the aforementioned stations to facilitate the efficient transfer of a plurality of battery stacking boxes such as stacking box 108, as indicated by the arrows in FIG. 1. The particular nature of each of the stacking boxes is described in detail in my prior copending application Ser. No. 652,715, filed Jan. 27, 1976, which is specifically incorporated by reference as if fully set forth herein.

During assembly of an industrial battery, battery stacking boxes which have been stored generally in the vicinity of the storage portion of the conveyor 110 are transferred empty either into tilt table position 112 or tilt table position 114, which positions are seen to communicate with the main conveying portions by spur portions 116 and 118. Once battery boxes 120 and 122 are in the loading position shown in FIG. 1, the conveyor portion thereunder is tilted backwards through an acute angle away from the position of the stackers 124 and 126. In this position, the battery box will naturally aid in the alignment of plates and separators which are introduced therein from stacking tables 128, 130 and from storage positions 132, 134, 136 and 138. Depending upon the number of plates to be put into each individual stack and the number of stacks to be made within each individual battery box during a given burn, relatively greater or lesser numbers of plates and separators are introduced into battery stacking boxes 120 and 122 with appropriate spacers of uniform preselected dimensions being introduced at appropriate sections in order to easily define individual stacks. The battery stacking boxes 120 and 122 are then readied in accordance with the instructions described in prior copending application referred to above, so that the plates and separators are retained within the battery stacking box for subsequent transfer to the burning station 102. As, for example, in the direction of arrow A, these boxes move along the feed portion 140 of the conveying surface designated generally 106 and are generally moved towards one edge of the feed portion by guide 142, for subsequent introduction under the burning head designated generally 144. Following formation of battery straps and terminal posts on the battery stacks, the battery boxes are transferred as indicated by the arrows B back under the rear portion of the burning station adjacent to the hoisting station 104, whereupon the ram 146 of a stacking box such as stacking box 148 may be withdrawn by the operator and a hoist designed to track along beam 150, which in turn tracks along transverse beams 152 and 154, is provided which facilitates the engagement of each individual battery stack by its battery straps for subsequent transfer into battery jars located at position 156. Preferably, the conveying surface 106 is elevated from the floor by a distance at least as high as the height of the battery jars to be filled by the battery stacks, so that, upon removal from the battery stacking box 148, the battery stacks 158 may be laterally transferred and then lowered directly into those battery jars. From the above description of the overall process, it may be seen that the entire construction of fused battery stacks and the subsequent transfer of those stacks is accomplished without the necessity to manually lift more than one plate or more than one separator at a time, while nonetheless facilitating for a rapid, efficient assembly of fused industrial battery stacks into the appropriate battery jars.

Figure 2:
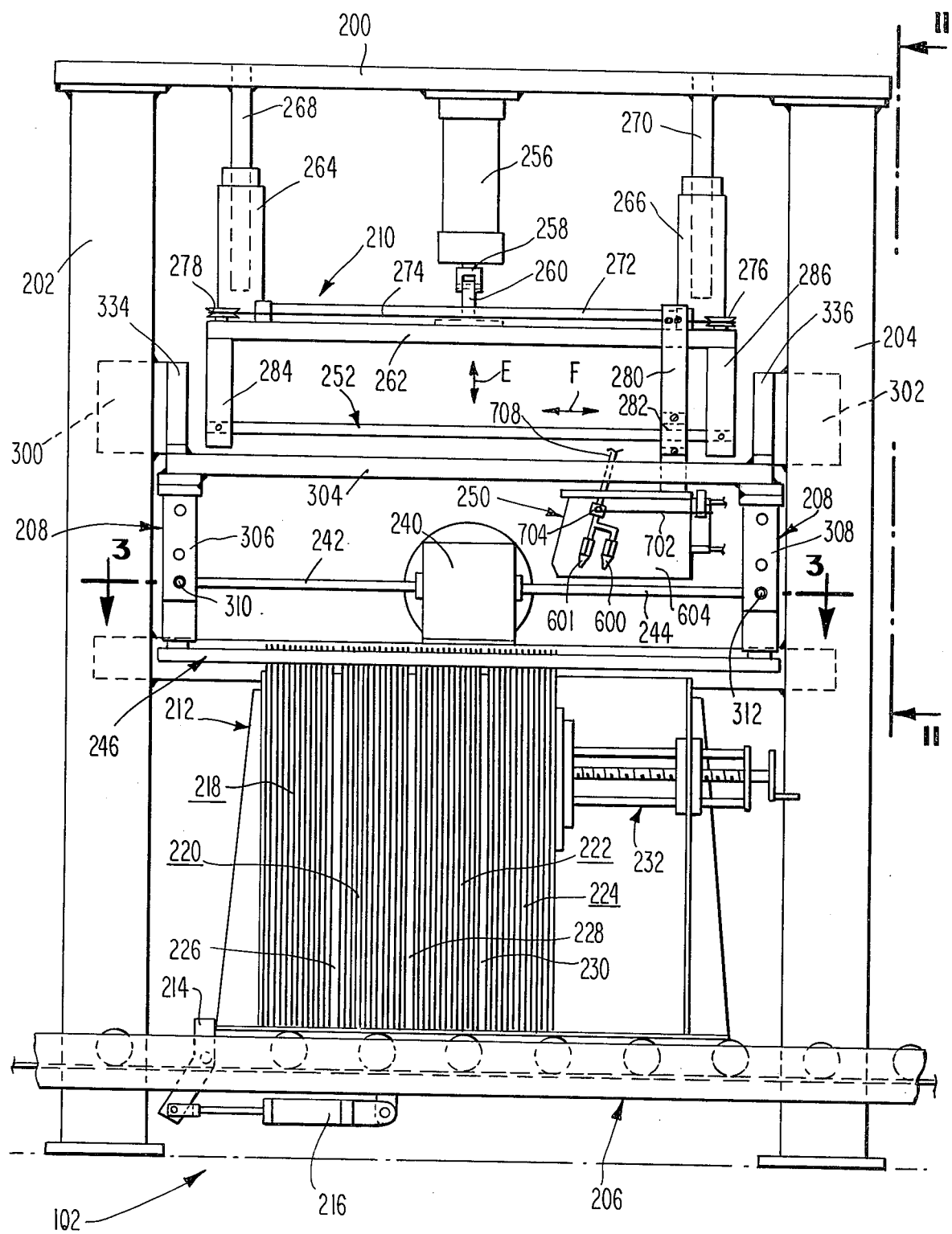
FIG. 2 is a front plan view of the burning station of the present invention taken as indicated by the lines and arrows 2—2 in FIG. 1.

Referring now to FIG. 2, the burning station designated generally 102 is illustrated comprising a top plate 200, supporting posts 202 and 204, conveying surface designated generally 206, comb assembly designated generally 208 and the burning head designated generally 210. A stacking box designated generally 212 having a plurality of battery stacks disposed therein is shown stopped in an appropriate position on conveying surface 206 by stop 214, which is appropriately actuated by cylinder 216. Within the battery stacking box designated generally 212 are stacks 218, 220, 222 and 224, which have disposed therebetween spacers 226, 228 and 230. The ram designated generally 232 is shown applying a suitable compression on the battery stacks in order to produce an appropriate spacing of the top terminal lugs thereon. The battery stacking box designated generally 212 is shown with the floor removed in order to facilitate battery plates and separators of a maximum height. When shorter plates and separators to produce shorter stacks are used, an adjustable floor as described in my prior copending application referred to above is appropriately placed within the stacking column of the battery box so that the top terminal edges of the plates are maintained in coplanar relationship with the top edges of the battery stacking box. Once a battery box, such as battery stacking box 212, is introduced into the burning position as shown in FIG. 2, the comb assembly designated generally 208 is activated by motor 240, which drives shafts 242 and 244 to close the combs designated generally 246, which closure will be more fully described hereinafter. The burning head, designated generally 210, comprises a torch carriage designated generally 250, which is mounted for a reciprocal movement along torch carriage rails designated generally 252 for reciprocal movement in the direction of arrow F in FIG. 2. The entire burning head assembly is also reciprocally movable in an axis as indicated by double-ended arrow E shown in FIG. 2, which movement is caused by the activation of cylinder 256, the cylinder rod 258 of which is attached to bracket 260, which in turn is welded or otherwise attached to burning head plate 262. Cylindrical guides 264 and 266 are journalled with shafts 268 and 270 to maintain the alignment of the burning head while it is being moved between the standby position shown in FIG. 2 and the burning position illustrated in FIGS. 5 and 6. The reciprocal movement of the torch carriage designated generally 250 is accomplished by the actuation of cable cylinder 272, which is disposed above burning head top plate 262 to thereby be shielded from the heat emanating from the torches disposed on torch carriage 250. Emanating from either end of cable cylinder 272 is a continuous cable loop 274, which is disposed around pulleys 276 and 278, which cable is firmly attached to torch carriage bar 280. The torch carriage rails designated generally 252 comprises two parallel spaced apart cylindrical rods which are journalled in bearings 282 of the torch carriage, which tracks designated generally 252 are fixedly attached to the burning head at their ends by engagement with burning head end plates 284 and 286.

The comb assembly designated generally 208 is rigidly attached to the main supports 202 and 204 by comb assembly supporting plates 300 and 302, which in turn support comb assembly top plate 304. Comb assembly end plates 306 and 308 are supported by comb assembly top plate 304, and in turn act as support for the combs designated generally 246, as will be described more fully hereinafter.

Figure 3:
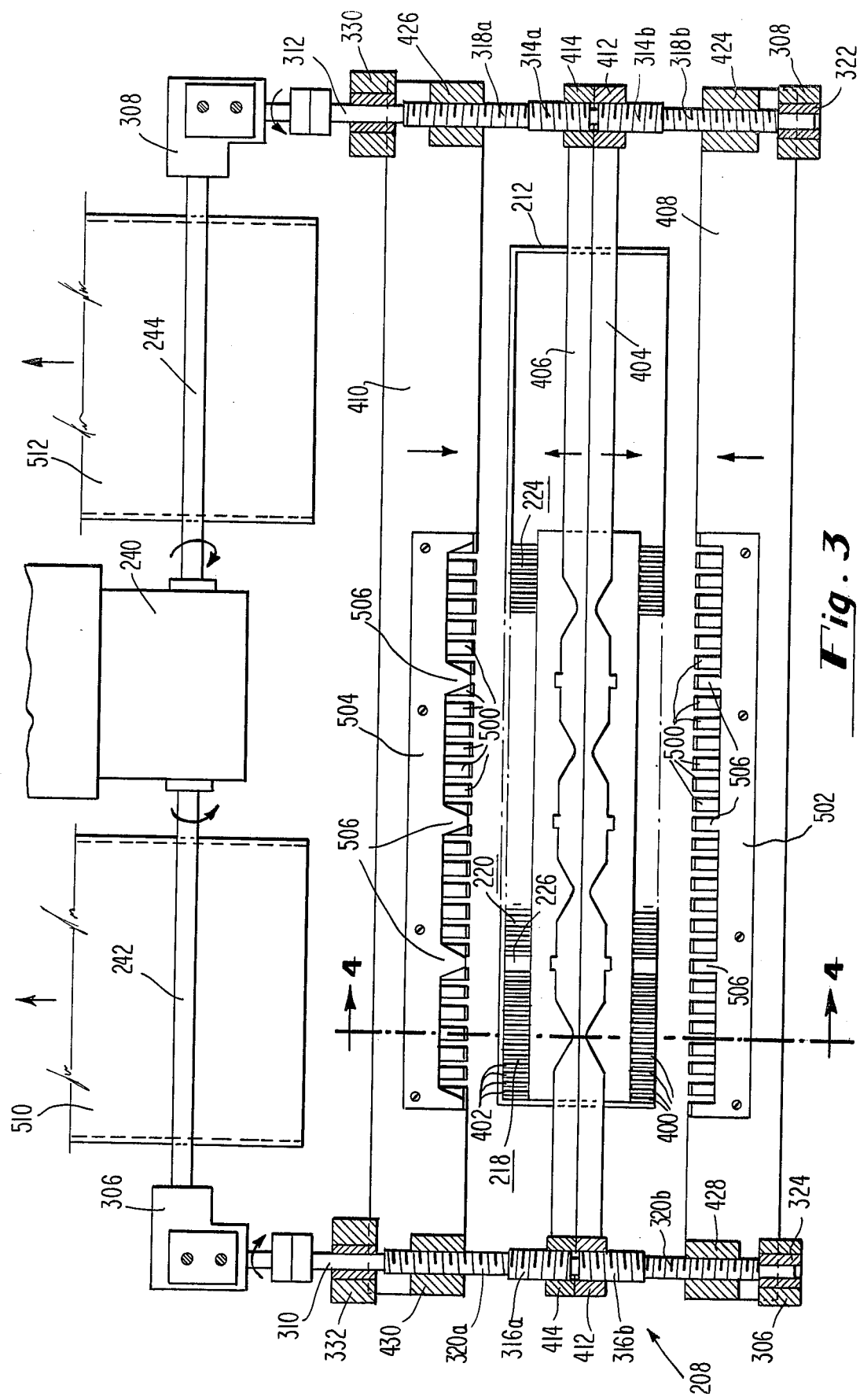
FIG. 3 is a top cross section of a portion of the burning station illustrated in FIG. 2 showing the interrelationship between the combs and battery stacks, which view is taken as indicated by the lines and arrows 3—3 in FIG. 2, on an enlarged scale.

Referring now to FIG. 3, which is taken along the lines and arrows 3—3 as indicated in FIG. 2, the details of the comb assembly designated generally 208 is illustrated. Motor 240 and shaft 242 and 244 are seen from the top view, which drive shafts terminate within perpendicular drive blocks 306 and 308 respectively. As drive shafts 242 and 244 are driven as shown by the adjacent arrows indicated in FIG. 3, parallel comb drive shafts 310 and 312 more in the direction shown by the arrows adjacent those drive shafts.

Referring now to FIG. 11 in combination with FIG. 3, the action of the combs with respect to the battery stacks 218, 220, 222 and 224 is illustrated. Comb drive shafts 310 and 312 are provided with inner comb threaded sections 314a and 314b and 316a and 316b, and outer comb threaded sections 318a and 318b and 320a and 320b. Parallel comb drive shafts 312 and 310 terminate within bushings 322 and 324 within comb assembly end plates 308 and 306 respectively. In addition to comb assembly end plates 306 and 308, comb assembly supporting plates 330 and 332 are welded to the appropriate portions of the comb assembly top plate 304, which in FIG. 11 is seen to be split into an outer portion 304a and an inner portion 304b in order to faciliate the disposition of the burning head designated generally 250 therebetween. As shown in FIGS. 11 and 3, comb assembly supporting plates 300 and 302 have welded thereto struts 334 and 336, which are generally triangular and which extend outwardly from main supports 300 and 302 to support the appropriately disposed coplanar sections of comb assembly top plate 304. During the operation of the machine, a stacking box such as that designated 212 in FIG. 11, containing appropriately aligned and spaced battery stacks is introduced for burning along an axis generally perpendicular to the paper as illustrated in FIG. 11. Protruding from the battery stacking box are the positive and negative lugs of the positive and negative plates within the battery stack. These lugs form long rows as illustrated in FIG. 3, each of which lugs within a single stack are to be fused with the adjacent lugs thereof. When introduced into the burning station, the inner combs 404 and 406 are contiguous in the position shown in FIGS. 3 and 11. Similarly, the outer combs 408 and 410 are positioned as shown in FIGS. 3 and 11 so that a clearance is created therebetween allowing for the axial introduction of the protruding lugs 400 and 402 therebetween. The movement of the inner and outer combs to this position is facilitated by the interaction between comb drive shafts 312 and 310 and the appropriate threaded sections thereof with respect to the comb alignment plates which have threaded bores disposed therein. The inner combs 404 and 406 are therefore supported, aligned and moved by comb alignment plates 412 and 414 which extend generally vertically upwardly from the combs 404 and 406 respectively, and have bores and bushings defined therein which are journalled with comb drive shafts 416, 418, 420 and 422. Similarly, the outer comb alignment plates 424, 426, 428 and 430 contain threaded bores which interact with comb drive shaft sections 318b, 318a, 320b and 320a respectively, and are further provided with bushings which are journalled with the aforementioned comb alignment guide shafts 416 and 418. Angle bracket 432 and brace 434 are provided in order to ensure the rigidity of the entire assembly, and particularly the rigidity of the comb assembly end plates 306 and 308 and the comb assembly supporting plates 330 and 332. The result is the provision of combs 304, 306, 308 and 310, which are movable in response to motor 240 along two parallel slightly spaced apart substantially horizontal planes, as will be discussed more fully hereinafter.

The operation of the combs during the function of the burning station may best be explained as follows:

Referring to FIGS. 3 and 11, prior to operation of the burning station the combs are retracted to the position illustrated in FIGS. 3 and 11 by operation of motor 240, which drives shafts 242 and 244 through perpendicular drive bracket 306 and 308, and more particularly, by means of gears 436 and 438 illustrated in FIG. 11, which in turn produce rotation of comb drive shafts 310 and 312 and the threaded sections thereof. Since the pitch of the inner and outer threaded sections of the comb drive shafts is reversed, rotation of the comb drive shafts 310 and 312 in a given direction will produce movement of the inner and outer combs toward and away from each other. Therefore, as shown by the arrows illustrated in FIG. 11, after introduction of the battery stacking box generally designated 212 therebetween, activation of motor 240 moves the inner and outer combs generally in the direction of those arrows, until the appropriate fingers and stops of the combs meet with substantial resistance, causing the stalling of motor 240. By varying the pitch and rotation of the threads, it is therefore possible to move the inner and outer combs different distances in the desired direction to thereby ensure that in the stalled or closed position the fingers of the combs surround the appropriate lugs to be welded.

The particular configuration of the combs is best illustrated in FIGS. 3 and 4 of the drawings, wherein the combs may be seen to comprise a plurality of fingers 500, each of which will extend between the spaces formed between the protruding lugs 400 and 402 to form the bottom of the mold which is used in the subsequent burning process. Depending upon the number of plates required for the particular battery stack to be formed, templates 502 and 504 are fitted into appropriate recesses formed in the outer combs 408 and 410 respectively, which templates have overlapping protrusions 506 of a desired configuration formed thereon, which in combination with the particular configuration selected for the inner combs will differentiate one stack from the next. Therefore, as seen in FIG. 3, appropriate projections from the inner combs and the projections 506 from the outer combs generally are in alignment over the battery stack spacers 226, 228 and 230 of the stacks which have been introduced into the machine for burning. Exhaust dusts 510 and 512 are also illustrated in FIG. 3, but have been removed for clarity from many of the remaining figures. These exhaust dusts 510 and 512 may be seen to be appropriately disposed adjacent the lugs to thereby remove and entrain any noxious fumes caused by the burning operation.

Figure 8:
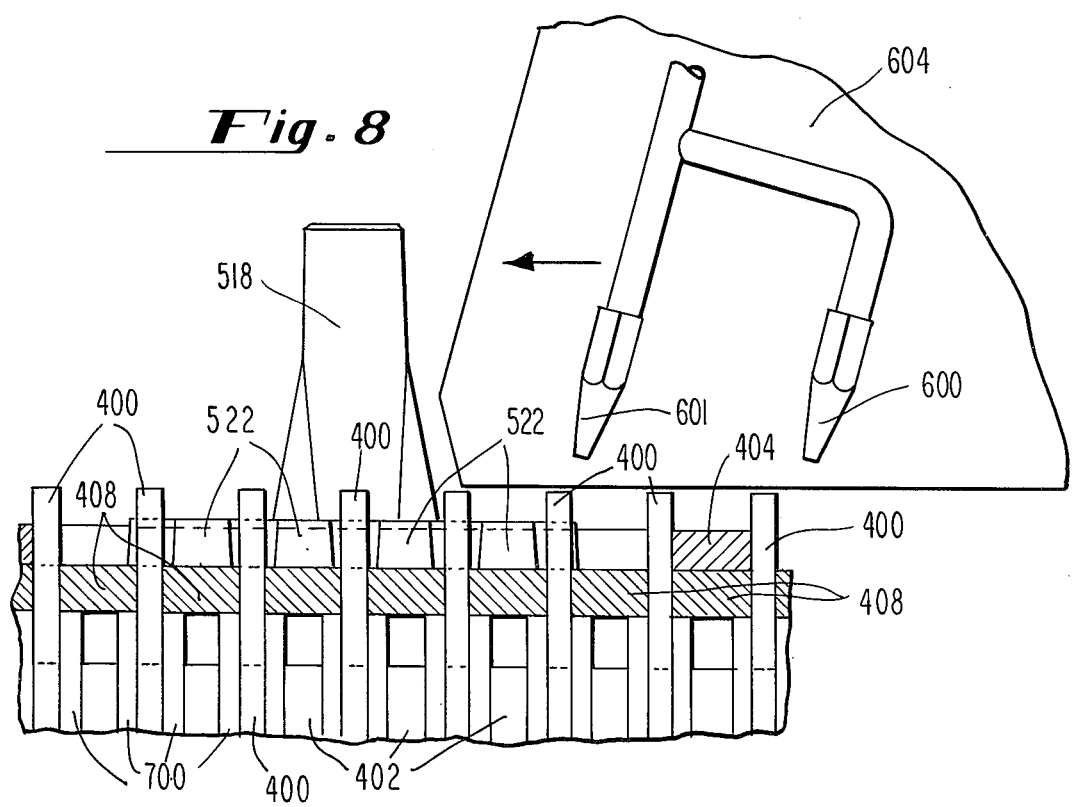
FIG. 8 is a side view of a portion of the apparatus illustrated in FIG. 7 taken as indicated by the lines and arrows 8—8 in FIG. 7, illustrating the relationship between the torches, shields, battery posts, lugs, plates, separators and combs; this view is taken on a greatly enlarged scale.

Referring now to FIG. 4, which is an enlarged cross section of a portion of the combs with respect to the lugs to be welded, the alignment of the inner and outer combs is better illustrated. The positive and negative lugs 400 and 402 are illustrated and a dam 512 which is a plate having two longitudinally extending grooves 514 and 516 defined therein is seen in its position between lugs 400 and 402. Dam 512 is placed across the top of the plates extending entirely along the stacks to be welded so that upon introduction of the stacking box 212 into the burning station the inner combs 404 and 406 will slide along dam 512 and will form a lead seal therebetween. Once the battery stacking box is in place, the combs are automatically moved as aforesaid from the retracted to the closed position as illustrated in FIG. 7. In this position, posts 518 and 520 are manually inserted, which posts are provided with fingers 522 and 524, which extend between the portions of the upstanding lugs 400 and 402. The fingers 500 and longitudinally extending grooves 514 and 516 of the dam 512 mate in the closed position so that an appropriately configured molding cavity is formed by the inner surfaces of the templates 504, combs 408 and 410, dam 512 and inner combs 404 and 406. Once this appropriate molding cavity has been formed and the battery posts 518 and 520 inserted therein, activation of cylinder 256 will cause the torch carriage to move the torches 600 and 602 and their associated shields 604 and 606 into the burning position, as shown in FIG. 7, as will be explained more fully hereinafter. This interrelationship is well illustrated in FIG. 8, which shows torches 600 and 601 with its associated shield 604 oriented over lugs 400. Each of the torch tips 601 and 600 is seen to be oriented to point slightly forward with respect to the path of advancement of the torch carriage as indicated by the arrow in FIG. 8. Applicants have determined that the orientation of the torch tips should be between five and 20° from the vertical axis, and more particularly, should be approximately 15° from the vertical axis with the leading torch tip 601 and the trailing torch tip 600 being disposed at the same distance slightly apart from the tips of the lugs 400 to be welded. The shield 604 is seen to be disposed between the torch tips 601 and 600 and the posts 518, which might otherwise adversely be affected by the flames emanating from the torch tips during welding. The shield 604 is seen to extend down to nearly touch the tips of the lugs 400 to be welded to provide a maximum shielding effect. As seen in FIG. 8, the appropriate portions of the outer comb 408 has been taken in cross section in order to show the bottom of the molding cavity formed by that comb with respect to the lugs 400 which protrude therethrough and the fingers 522 of the posts 518 which rest thereon prior to welding. As seen on the right in FIG. 8, an overlapping protrusion 506, also shown in cross section lies on top of the appropriate portion of the outer comb 408 to differentiate the battery stack beginning with the rightmost lug 400 and the remaining lugs shown in FIG. 8 which comprise a single stack. Also shown in FIG. 8 are the separators 700 and the ends of the battery plates of alternate polarity 402, which, of course, do not have protruding lugs on the same side as the plates having lugs 400 shown in FIG. 8.

Figure 5:
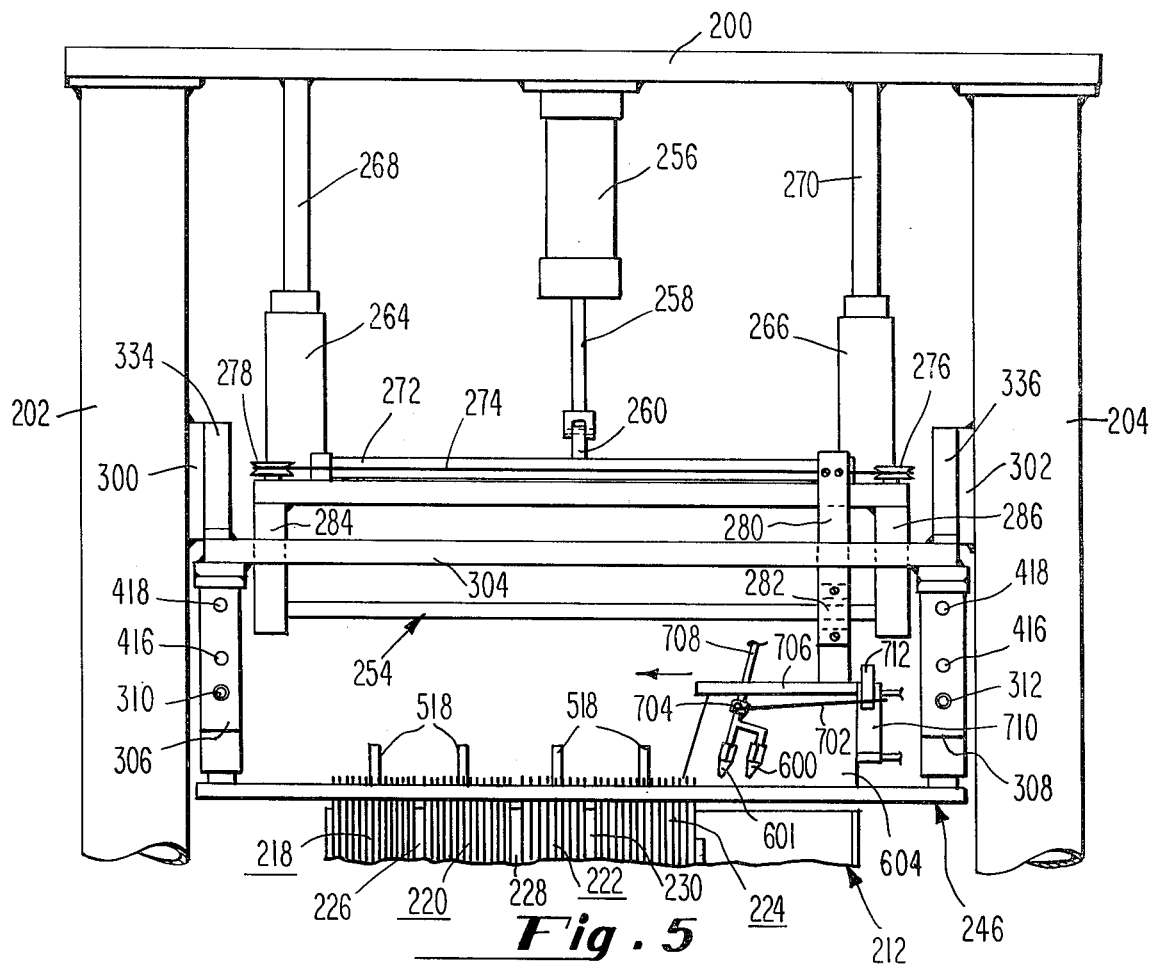
FIG. 5 is a front plan view of a portion of the apparatus shown in FIG. 2 wherein the torch carriage has been moved from the standby to the burning position, taken on a reduced scale.

The actual fusion process and operation of the torch carriage may be best explained by referring to FIGS. 5, 6, 7, 9, 10 and 11. Following introduction of the battery stacking box 212 into the burning apparatus and closure of the combs as previously described, the burning head is lowered from the standby to the burning position by activation of cylinder 256, which extends cylinder rod 258 and causes subsequent lowering of the burning head to the position illustrated in FIG. 5. In this position the torch carriage, which begins the cycle at one end of the rails or tracks designated generally 254 in FIG. 5, once the burning head is moved to the burning position as illustrated in FIG. 5, cylinder 710 is activated to move torch lever bracket 712 generally upwardly as seen in FIG. 5, which in turn moves torch lever 702 from the pilot to the burning position. Torch lever 702 acts on valve 704, which in the burning position increases the flow of fuel gas from supply 708 to the torch tips 600 and 601, to thereby increase the intensity of the flame emanating therefrom to a burning intensity. The disposition of torch cylinder 710, flame lever bracket 712, flame cylinder rod 716, and the torch levers 702 or 703 is best illustrated in FIG. 11, which shows that upon activation of flame cylinder rod 716 the flame trip bracket 712 will move generally upwardly as shown in FIG. 11 to activate the torch pairs for burning both pairs of lugs simultaneously. Once the torches are activated, cable cylinder 272 activates cable 274, which in turn, through cable catch 802 and torch carriage bar 280, moves the torch carriage along rods or tracks 800 and 801, which are seen in FIG. 11 to be supported by burning head end plates 284, 286, 287 and an additional torch carriage end plate not specifically illustrated in the drawings.

Figure 6:
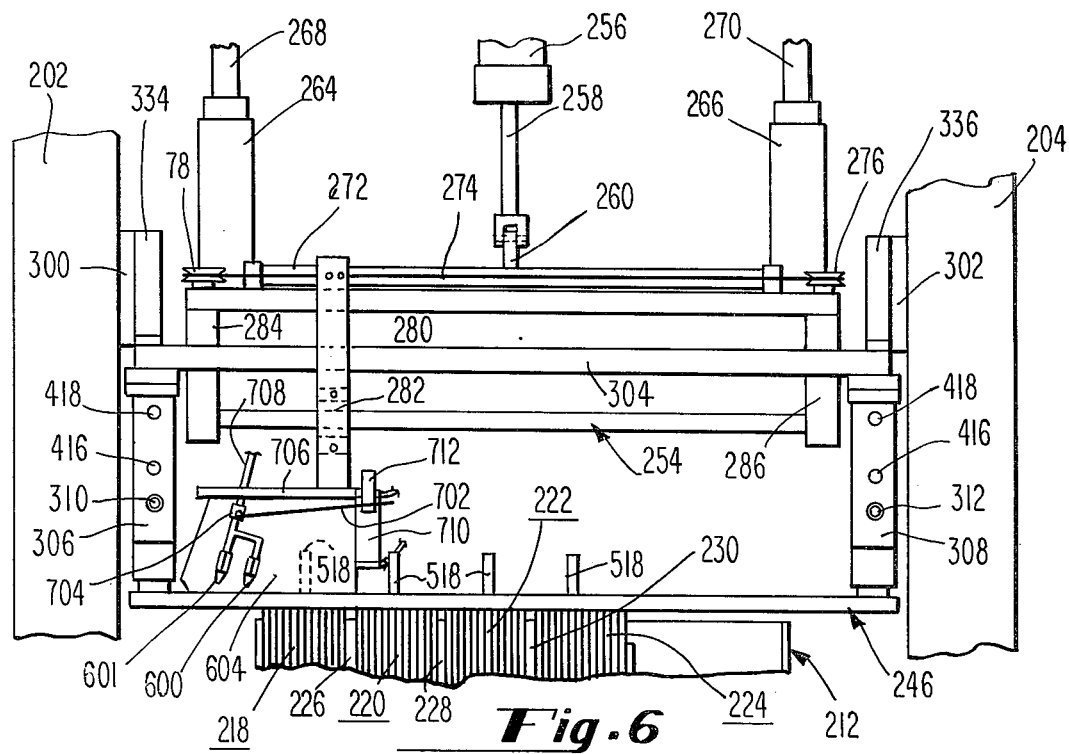
FIG. 6 is a front plan view of the portion of the apparatus shown in FIG. 5 wherein the torch carriage has moved along the burning axis from the start to the finish position.

Referring now to FIG. 6, the torch carriage may be seen in its end-of-burn position, having been moved across the battery stacks 218, 220, 222 and 224, having formed straps thereon. It will be noted that lugs no longer protrude above the combs designated generally 246, but rather, these lugs have been melted into the molding cavity formed by the combs to form said straps. When the torch carriages reach the end-of-burn position, as shown in FIG. 6, cylinder 256, which is preferably a double-acting cylinder, withdraws the burning head away from the fused battery stacks, and cylinder 710 is deactivated to allow the torch lever 702 to resume the pilot position. This retraction of the burning head allows the posts 518 to clear the shield of the torch carriage and to allow for the immediate retraction of the combs designated generally 246, and simultaneous release of the battery stacking box designated generally 212 from the apparatus, while the torch carriage is reciprocated to its start-of-burn position with respect to rails or tracks 254.

Figure 9:
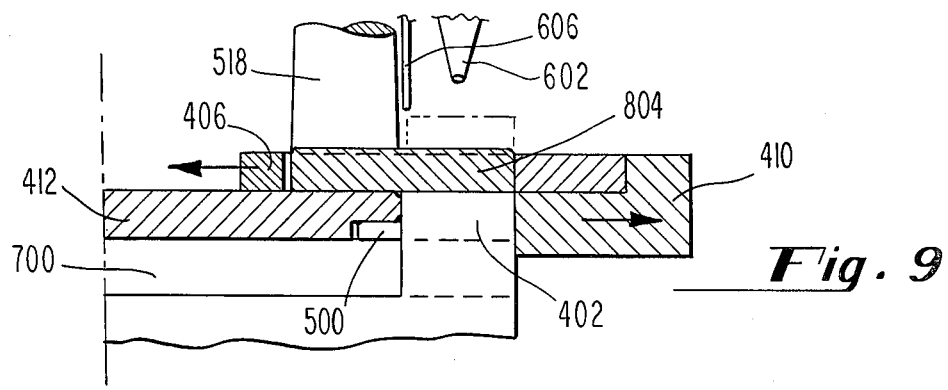
FIG. 9 is an end view of a portion of a fused battery stack with the combs in molding position.
Figure 10:
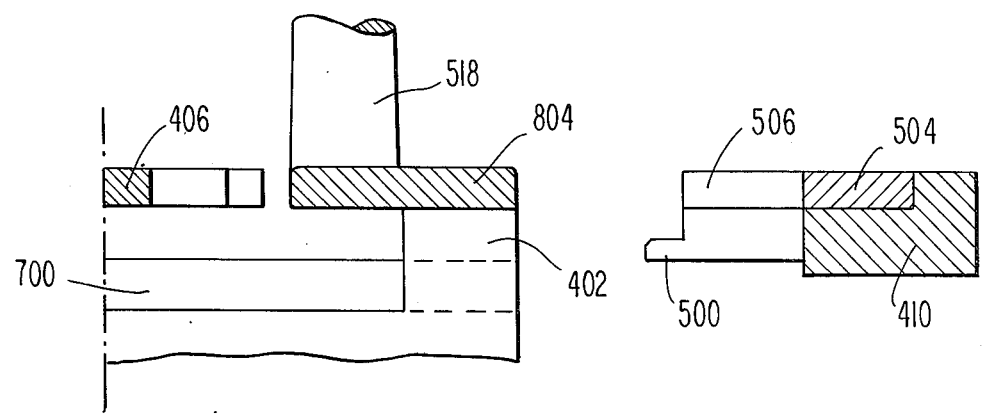
FIG. 10 is a view similar to FIG. 9 wherein the combs are illustrated in their standby position.

By the time the torch carrige has reached the end-of-burn position as illustrated in FIG. 6, the protruding portions of the lugs, such as lugs 402, have been partially melted and fused with the fingers 522 of the upstanding battery posts to form the battery strap 804 as illustrated in FIG. 9. That portion of the upstanding lug which has been melted is shown in FIG. 9 in phantom and the strap 804 is illustrated prior to retraction of the comb 406 and 410 in the direction of the arrows illustrated in FIG. 9. FIG. 10 illustrates the configuration of the strap 804 and its interrelationship with terminal posts 518 and lugs 402 following the retraction of the combs to the position shown in FIG. 10.

As illustrated in FIGS. 4, 7, 9 and 10, the dam or plate 512, which is laid across the top surface of the battery stack to be welded, conveniently rests upon portions of the separators 700 of the battery stack, which protruded slightly above the top edge of the battery stack, so that upon introduction of the stacking box designated generally 212 under the combs 404 and 406 a slight tension will be produced ensuring a good seal between the combs 404 and 406 and the contiguous surface of the dam 512. Therefore, the use of such a dam 512 facilitates the introduction of the battery stacks under the combs without the requirement for subsequent relative vertical movement of either the stacks to be welded or the comb assembly. As a result, rapid, efficient, high-quality battery straps may be fused on a plurality of battery stacks, which may be subsequently transferred for introduction at the hoisting station into appropriate jars.

It will be understood that various changes in the details, materials and arrangement of parts which have been herein described and illustrated in order to explain the nature of this invention may be made by those skilled in the art within the principle and scope of the invention as expressed in the following claims.

We claim:
1. A system for assembly industrial batteries, comprising:
  a. conveying surface, comprising: a main surface; and at least one spur surface contiguous to said main surface;
  b. a plurality of stacking box means freely movable across said conveying surface for selectively receiving, aligning and retaining the plates and separators of any of a plurality of sizes of battery plates so that the terminal edge of a battery stack formed from said separators and plates is locates in a reference plane substantially parallel to and spaced apart from said conveying surface at a preselected distance;

c. tilt table means for moving between a normal and a stacking position, said tilt table means comprising a tiltable portion of said spur surface, said tiltable portion in the normal position communicating with the remaining portion of said spur surface for transfer of one or more of said stacking box means therebetween, and in said stacking position for engaging and tilting said stacking box means through an acute angle with respect to said conveying surface to thereby allow the stacking of plates and separators therein; and d. a burning station in communication with said main surface for receiving at least one stacking box means having disposed therein at least one battery stack with a terminal edge disposed within said reference plane, said burning station operating to form battery straps.

2. The system of claim 1 further comprising hoisting means disposed above at least a portion of said main surface for engaging the straps formed by said burning station and for transferring a completed battery stack into battery jars resting on a surface substantially below said main surface.

3. The invention of claim 1 wherein said burning station has a plurality of combs reciprocally movable above said reference plane, said combs being appropriately configured to surround at least a portion of each of the terminal lugs of the plates of the battery stack on which straps are to be formed.

4. The invention of claim 1 wherein said conveying surface comprises a plurality of tiltable spur portions.

5. The invention of claim 1 wherein said system further comprises at least one stacking position adjacent said spur portion, said spur portion tiltable backwards through an acute angle away from said stacking position.

6. A system for assembling industrial batteries, comprising:

a. a conveying surface;

b. a plurality of stacking box means for freely moving across said conveying surface and for selectively receiving, aligning and retaining the plates and separators of any of a plurality of sizes of battery plates so that the terminal edge of a battery stack formed from said separators and plates is located in a reference plane substantially parallel to and spaced apart from said conveying surface at a preselected distance;

c. tilt table means for moving between a normal and a stacking position, said tilt table means in the normal position communicating with said conveying surface for transfer of one or more of said stacking box means therebetween, and in said stacking position for engaging and tilting said stacking box means through an acute angle with respect to said conveying surface to thereby allow the stacking of plates and separators therein; and d. a burning station in communication with said conveying surface for receiving at least one stacking box means having disposed therein at least one battery stack with a terminal edge disposed within said reference plane, said burning station further comprising a torch means for fusing the terminal lugs of each of said plates into said battery straps by moving along at least two transverse axes, at least one of which axes is a burning axis.

7. The invention of claim 6 wherein said second transverse axis facilitates withdrawal of said torch means from said burning axis in a direction generally away from said battery stacks.

8. The invention of claim 7 wherein said torch means is adapted to describe a substantially square path during the operation of said burning station.

9. A burning station for automatically fusing battery posts and battery lugs of an industrial battery stack, comprising:

a. a conveying surface;

b. a battery stacking box for receiving, aligning and retaining at least one battery stack at a predetermined position with respect to said conveying surface;

c. comb means for moving within a plane substantially parallel to said conveying surface between loading and molding positions, said comb means forming a molding cavity around at least a portion of the lugs of said battery stack when said comb means is in the molding position; and d. burning head means for moving along an axis transverse to the plane of movement of said comb means between standby and burning positions, said burning head means having mounted thereon torch carriage means for movement with respect to said burning head means along an axis substantially parallel to the plane of movement of said comb means.

10. The invention of claim 9 wherein said battery stacking box is movable across said conveyor surface along an axis substantially parallel to the axis of movement of said torch carriage.

11. The invention of claim 9 wherein said torch carriage further comprises a plurality of torches, said torches being directed at the portions of the battery stacks to be fused, and further being angled towards the path of advancement of the torch carriage across said battery stacks.

12. The invention of claim 11, wherein said torches are oriented at between ten and twenty degrees from the vertical in the direction of the path of advancement of said torch carriage across said battery stacks.

13. The invention of claim 12, wherein at least two parallel spaced apart torches are provided on said torch carriage for each battery strap to be formed.

14. The invention of claim 13, wherein each of said torches for fusing said strap is regulated by a single valve, and each of said valves is regulatable between pilot and burning position, is actuatable by a single cylinder.

* * * * *